United States Patent
Wu et al.

(10) Patent No.: US 11,006,436 B2
(45) Date of Patent: May 11, 2021

(54) SCHEDULING METHOD IN WIRELESS LOCAL AREA NETWORK, ACCESS POINT, AND STATION

(71) Applicant: HUAWEI TECHNOLOGIES CO., LTD., Guangdong (CN)

(72) Inventors: Ji Wu, Shanghai (CN); Yingpei Lin, Shanghai (CN); Lei Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/403,108

(22) Filed: May 3, 2019

(65) Prior Publication Data
US 2019/0261393 A1   Aug. 22, 2019

Related U.S. Application Data

(63) Continuation of application No. PCT/CN2017/107674, filed on Oct. 25, 2017.

(30) Foreign Application Priority Data

Nov. 4, 2016 (CN) .......................... 201610963145.0

(51) Int. Cl.
*H04W 72/12* (2009.01)
*H04B 7/0452* (2017.01)
(Continued)

(52) U.S. Cl.
CPC ...... *H04W 72/1257* (2013.01); *H04B 7/0413* (2013.01); *H04B 7/0452* (2013.01);
(Continued)

(58) Field of Classification Search
CPC . H04W 72/1257; H04W 72/12; H04W 88/08; H04W 84/12; H04W 76/40;
(Continued)

(56) References Cited

U.S. PATENT DOCUMENTS 10,218,824 B2 * 2/2019 Cariou .................... H04L 69/28
10,230,448 B2 * 3/2019 Calcev ..................... H04B 7/14
(Continued)

FOREIGN PATENT DOCUMENTS

CN 103001682 A 3/2013
CN 103563457 A 2/2014
(Continued)

OTHER PUBLICATIONS

Lei Huang et al. 11-16-1208-00-00ay-Scheduling Allocation on Multi-channels in 11ay, IEEE 802.11-16/1208r0, Sep. 13, 2016. total 14 pages.
(Continued)

*Primary Examiner* — Phirin Sam
*Assistant Examiner* — Louis Samara
(74) *Attorney, Agent, or Firm* — Womble Bond Dickinson (US) LLP

(57) ABSTRACT

Embodiments of this application disclose a scheduling method in a wireless local area network (WLAN), including: generating, by an access point (AP), scheduling information, where the scheduling information includes multiple-input multiple-output (MIMO) scheduling information or beamforming (BF) scheduling information, the MIMO scheduling information is used to schedule a station (STA) to perform MIMO communication, and the BF scheduling information is used to schedule the STA to perform beamforming training; and sending, by the AP, the scheduling information to the STA. According to the scheduling method in a WLAN that is disclosed in the embodiments of this application, the AP can implement, by using the scheduling information, scheduling for the MIMO communication of the STA and BF in a MIMO scenario, and an operation is simple and convenient.

20 Claims, 7 Drawing Sheets

(51) Int. Cl.
*H04B 7/06* (2006.01)
*H04B 7/08* (2006.01)
*H04W 88/08* (2009.01)
*H04B 7/0413* (2017.01)
*H04W 84/12* (2009.01)

(52) U.S. Cl.
CPC ........... *H04B 7/0617* (2013.01); *H04B 7/086* (2013.01); *H04W 72/12* (2013.01); *H04W 88/08* (2013.01); *H04W 84/12* (2013.01)

(58) Field of Classification Search
CPC ... H04W 24/08; H04B 7/0413; H04B 7/0452; H04B 7/0617; H04B 7/14; H04L 69/28
See application file for complete search history.

(56) References Cited

U.S. PATENT DOCUMENTS

| | | | |
|---|---|---|---|
| 2013/0235947 A1* | 9/2013 | Yao | H04B 7/0408 375/267 |
| 2014/0086131 A1 | 3/2014 | Seok | |
| 2016/0044711 A1 | 2/2016 | Lou et al. | |
| 2016/0142929 A1* | 5/2016 | Irie | H04W 24/08 370/252 |
| 2016/0255660 A1* | 9/2016 | Son | H04W 76/40 370/329 |
| 2016/0366688 A1* | 12/2016 | Chen | H04B 7/0697 |

FOREIGN PATENT DOCUMENTS

| | | |
|---|---|---|
| CN | 104734754 A | 6/2015 |
| CN | 105052235 A | 11/2015 |

OTHER PUBLICATIONS

Carlos Cordeiro et al. Specification Framework for Tgay, IEEE P802.11 Wireless LANs, 11-15-1358-07-00ay-11ay Spec Framework, IEEE 802.11-15/01358r7, Oct. 8, 2016. total 89 pages.

Carlos Cordeiro et al. Specification Framework for Tgay, IEEE 802.11-15/01358r11, IEEE P802.11 Wireless LANs, Sep. 14, 2016. total 79 pages.

* cited by examiner

| Quantity of bytes | 1 | 1 | 1 | 1 | 5*N | TBD2*N |
|---|---|---|---|---|---|---|
| | Element ID (Element identity) | Length (Length) | Element ID Extension (Element identity extension) | Number of Allocations (Quantity of allocations) | Channel Allocation (1–N) (Channel allocation) | MIMO/BF indication (MIMO/ Beamforming indication) |

| Quantity of bits | 24 | 1 | 8 | TBD1 | 7 |
|---|---|---|---|---|---|
| | MIMO type (MIMO type) | BFT type (Beamforming training type) | Number of ss (Quantity of communication spatial streams) | Antenna Bitmap (Antenna bitmap) | MCS (Modulation and coding scheme) |

FIG. 3

SCHEDULING METHOD IN WIRELESS LOCAL AREA NETWORK, ACCESS POINT, AND STATION

CROSS-REFERENCE TO RELATED APPLICATIONS

This application is a continuation of International Application No. PCT/CN2017/107674, filed on Oct. 25, 2017, which claims priority to Chinese Patent Application No. 201610963145.0, filed on Nov. 4, 2016. The disclosures of the aforementioned applications are incorporated herein by reference in their entireties.

TECHNICAL FIELD

Embodiments of this application relate to the communications field, and more specifically, to a scheduling method in a wireless local area network (WLAN), an access point (AP), and a station (STA).

BACKGROUND 802.11ad is a wireless communications standard that defines an operating frequency band of 60 gigahertz (GHz). Because a path loss at the frequency band of 60 GHz is relatively large, beamforming (BF) of a directional antenna needs to be used to improve an antenna gain in communication at 60 GHz. Different from a conventional omnidirectional antenna, the directional antenna can centralize energy of a transmitted electromagnetic wave on a relatively narrow azimuth, and a receive antenna can also direct a receiving direction of the receive antenna to a relatively narrow azimuth. This can improve gains of a transmit antenna and the receive antenna, and effectively resist a path loss. A series of steps need to be performed to align a direction of a best transmit beam of a data transmitter with a direction of a best receive beam of a data receiver, to obtain a largest gain. This process is referred to as beamforming training (BFT). The BFT is implemented by sending bidirectional sector sweep (SSW) frames by the transmitter and the receiver. A BFT process is mainly divided into two subprocesses: sector level sweep (SLS) and the beam refinement protocol (BRP). At an SLS phase, beam information required for sending and receiving a signal is provided for a STA, in other words, a beam at this phase is relatively wide. After the SLS phase, the STA and an AP determine optimal transmit and receive beams of each other by using BRP frames. The 802.11ad standard supports only single-input single-output (SISO) communication between an AP and a STA on a 2.16 GHz channel through one antenna. 802.11ay is a next-generation standard of 802.11ad. A main difference from 802.11ad lies in that 802.11 ay supports single-user multiple-input multiple-output (single-user multiple-input multiple-output, SU-MIMO) and downlink multi-user MIMO (MIMO, DL MU-MIMO) communication between an AP and a STA on a plurality of 2.16 GHz channels.

Beamforming training of 802.11ad is performed in a single-user mode, and an AP sequentially performs beamforming training with STAs. However, 802.11ay requires support for multi-user beamforming training.

In 802.11ad, scheduling for data transmission/beamforming training is mainly performing indication in a directional multi-gigabit (DMG) extended schedule element (extended schedule element) in a beacon frame and an announcement frame. However, the DMG extended schedule element supports scheduling for an AP and a STA only on one 2.16 GHz channel, and does not support scheduling for MIMO or MIMO BF. How to perform BF resource indication and MIMO resource indication is a problem that needs to be resolved.

SUMMARY

Embodiments of this application provide a scheduling method in a wireless local area network WLAN, so that an AP can implement, by using scheduling information, scheduling for MIMO communication of a STA and BF in a MIMO scenario, and an operation is simple and convenient.

According to a first aspect, a scheduling method in a wireless local area network WLAN is provided, including: generating, by an access point AP, scheduling information, where the scheduling information includes multiple-input multiple-output MIMO scheduling information or beamforming BF scheduling information, the MIMO scheduling information is used to schedule a station STA to perform MIMO communication, and the BF scheduling information is used to schedule the STA to perform beamforming training; and sending, by the AP, the scheduling information to the STA.

In 802.11ad, scheduling for data transmission/beamforming training is mainly performing indication in a directional multi-gigabit DMG extended schedule element in a beacon frame and an announcement frame. However, the DMG extended schedule element supports scheduling for an AP and a STA only on one 2.16 GHz channel, and does not support scheduling for MIMO or MIMO BF.

According to the scheduling method in a wireless local area network WLAN in this embodiment of this application, the AP can implement, by using the scheduling information, scheduling for the MIMO communication of the STA and BF in a MIMO scenario, and an operation is simple and convenient.

In one implementation, the sending, by the AP, the scheduling information to the STA includes: sending, by the AP, a beacon frame or an announcement frame to the STA, where the beacon frame or the announcement frame includes the scheduling information.

The AP sends the scheduling information by using the beacon frame or the announcement frame, thereby improving flexibility of system scheduling/resource indication.

In one implementation, at least a part of the scheduling information is carried in a scheduling information indication field, and the scheduling information indication field is included in the beacon frame or the announcement frame.

In one implementation, the MIMO scheduling information includes first antenna identity ID information and modulation and coding scheme MCS information, the first antenna ID information is carried in a first antenna identity ID indication field, the first antenna ID information is used to indicate an antenna, of the STA, that participates in the MIMO communication, the MCS information is carried in an MCS indication field, and the MCS information is used to indicate an uplink MCS value that the AP suggests the STA to use.

In one implementation, the MIMO scheduling information further includes first spatial stream quantity indication information, the first spatial stream quantity indication information is carried in a first spatial stream quantity indication field, and the first spatial stream quantity indication information is used to indicate a quantity of spatial streams in the MIMO communication.

In one implementation, the MIMO scheduling information further includes first MIMO type information, the first MIMO type information is carried in a first MIMO type indication field, and the first MIMO type information is used to instruct the STA to perform communication by using a single-user multiple-input multiple-output SU-MIMO BF configuration or a multi-user multiple-input multiple-output MU-MIMO BF configuration.

In one implementation, the MIMO scheduling information further includes first BF type information, the first BF type information is carried in a first BF type indication field, and the first BF type information is used to instruct the STA to perform communication by using a fine BF configuration or a coarse BF configuration.

In one implementation, the BF scheduling information includes second spatial stream quantity information, second MIMO type information, second BF type information, and second antenna identity ID information; the second spatial stream quantity information is carried in a second spatial stream quantity indication field; the second spatial stream quantity indication information is used to indicate, to the STA, a quantity of spatial streams in the beamforming training; the second MIMO type information is carried in a second MIMO type indication field; the second MIMO type information is used to instruct the STA to perform SU-MIMO-type beamforming training or perform MU-MIMO-type beamforming training; the second BF type information is carried in a second BF type indication field; the second BF type information is used to instruct the STA to perform coarse beamforming training or fine beamforming training; the second antenna ID information is carried in a second antenna ID indication field; and the second antenna ID information is used to indicate a quantity of sector sweep SSW frames that need to be sent by the AP.

In one implementation, the second antenna ID indication field occupies a reserved bit in a beamforming control field in a DMG extended schedule element.

In one implementation, the beacon frame or the announcement frame further includes an information indication field, and the information indication field is used to indicate that the beacon frame or the announcement frame includes the scheduling information.

In a possible implementation, the information indication field occupies a reserved bit in an allocation control field in a directional multi-gigabit DMG extended schedule element in the beacon frame or the announcement frame, or the information indication field occupies a reserved bit in a channel allocation field in an enhanced directional multi-gigabit EDMG extended schedule element in the beacon frame or the announcement frame.

In a possible implementation, the first MIMO type indication field and the second MIMO type indication field may be a same field in the scheduling information indication field. The first spatial stream quantity indication field and the second spatial stream quantity indication field may be a same field in the scheduling information indication field. The first antenna identity ID indication field and the second antenna identity ID indication field may be a same field in the scheduling information indication field. The first BF type indication field and the second BF type indication field may be a same field in the scheduling information indication field. In other words, in this embodiment of this application, scheduling at a MIMO communication phase and scheduling at a BFT phase may be performed for the STA by sending, to the AP, frames of a same structure, such as the beacon frame or the announcement frame; and the scheduling at the MIMO communication phase and the scheduling at the BFT training phase do not need to be separately performed for the STA by using frames of different frame structures.

According to a second aspect, a scheduling method in a wireless local area network WLAN is provided, including: receiving, by a station STA, scheduling information sent by an access point AP, where the scheduling information includes multiple-input multiple-output MIMO scheduling information or beamforming BF scheduling information, the MIMO scheduling information is used to schedule the station STA to perform MIMO communication, and the BF scheduling information is used to schedule the STA to perform beamforming training; and performing, by the STA, beamforming training or communication based on the scheduling information.

In one implementation, the receiving, by a station STA, scheduling information sent by an access point AP includes:

receiving, by the STA, a beacon frame or an announcement frame sent by the AP, where the beacon frame or the announcement frame includes the scheduling information.

In one implementation, at least a part of the scheduling information is carried in a scheduling information indication field, and the scheduling information indication field is included in the beacon frame or the announcement frame.

In one implementation, the MIMO scheduling information includes first antenna identity ID information and modulation and coding scheme MCS information, the first antenna ID information is carried in a first antenna identity ID indication field, the first antenna ID information is used to indicate an antenna, of the STA, that participates in the MIMO communication, the MCS information is carried in an MCS indication field, and the MCS information is used to indicate an uplink MCS value that the AP suggests the STA to use.

In one implementation, the MIMO scheduling information further includes first spatial stream quantity indication information, the first spatial stream quantity indication information is carried in a first spatial stream quantity indication field, and the first spatial stream quantity indication information is used to indicate a quantity of spatial streams in the MIMO communication.

In one implementation, the MIMO scheduling information further includes first MIMO type information, the first MIMO type information is carried in a first MIMO type indication field, and the first MIMO type information is used to instruct the STA to perform communication by using a single-user multiple-input multiple-output SU-MIMO BF configuration or a multi-user multiple-input multiple-output MU-MIMO BF configuration.

In one implementation, the MIMO scheduling information further includes first BF type information, the first BF type information is carried in a first BF type indication field, and the first BF type information is used to instruct the STA to perform communication by using a fine BF configuration or a coarse BF configuration.

In one implementation, the BF scheduling information includes second spatial stream quantity information, second MIMO type information, second BF type information, and second antenna identity ID information; the second spatial stream quantity information is carried in a second spatial stream quantity indication field; the second spatial stream quantity indication information is used to indicate, to the STA, a quantity of spatial streams in the beamforming training; the second MIMO type information is carried in a second MIMO type indication field; the second MIMO type information is used to instruct the STA to perform SU-MIMO-type beamforming training or perform MU-MIMO-type beamforming training; the second BF type information is carried in a second BF type indication field; the second BF type information is used to instruct the STA to perform coarse beamforming training or fine beamforming training; the second antenna ID information is carried in a second antenna ID indication field; and the second antenna ID information is used to indicate a quantity of sector sweep SSW frames that need to be sent by the AP.

In one implementation, the second antenna ID indication field occupies a reserved bit in a beamforming control field in a DMG extended schedule element.

In one implementation, the beacon frame or the announcement frame further includes an information indication field, and the information indication field is used to indicate that the beacon frame or the announcement frame includes the scheduling information.

In one implementation, the information indication field occupies a reserved bit in an allocation control field in a directional multi-gigabit DMG extended schedule element in the beacon frame or the announcement frame, or the information indication field occupies a reserved bit in a channel allocation field in an enhanced directional multi-gigabit EDMG extended schedule element in the beacon frame or the announcement frame.

In one implementation, the first MIMO type indication field and the second MIMO type indication field may be a same field in the scheduling information indication field. The first spatial stream quantity indication field and the second spatial stream quantity indication field may be a same field in the scheduling information indication field. The first antenna identity ID indication field and the second antenna identity ID indication field may be a same field in the scheduling information indication field. The first BF type indication field and the second BF type indication field may be a same field in the scheduling information indication field. In other words, in this embodiment of this application, scheduling at a MIMO communication phase and scheduling at a BFT training phase may be performed for the STA by sending, to the AP, frames of a same structure, such as the beacon frame or the announcement frame; and the scheduling at the MIMO communication phase and the scheduling at the BFT training phase do not need to be separately performed for the STA by using frames of different frame structures.

According to a third aspect, an access point AP is provided and configured to perform the method in the first aspect or any possible implementation of the first aspect. Specifically, the access point AP includes units configured to perform the method in the first aspect or any possible implementation of the first aspect.

According to a fourth aspect, a station STA is provided and configured to perform the method in the second aspect or any possible implementation of the second aspect. Specifically, the station STA includes units configured to perform the method in the second aspect or any possible implementation of the second aspect.

According to a fifth aspect, an access point AP is provided, where the access point AP includes a receiver, a transmitter, a processor, a memory, and a bus system. The receiver, the transmitter, the processor, and the memory are connected by using the bus system. The memory is configured to store an instruction. The processor is configured to execute the instruction stored in the memory, so as to control the receiver to receive a signal, and control the transmitter to send a signal. In addition, when the processor executes the instruction stored in the memory, the execution enables the processor to perform the method in the first aspect or any possible implementation of the first aspect.

According to a sixth aspect, a station STA is provided, where the station STA includes a receiver, a transmitter, a processor, a memory, and a bus system. The receiver, the transmitter, the processor, and the memory are connected by using the bus system. The memory is configured to store an instruction. The processor is configured to execute the instruction stored in the memory, so as to control the receiver to receive a signal, and control the transmitter to send a signal. In addition, when the processor executes the instruction stored in the memory, the execution enables the processor to perform the method in the second aspect or any possible implementation of the second aspect.

According to a seventh aspect, a computer-readable medium is provided and configured to store a computer program, where the computer program includes an instruction used to perform the method in the first aspect or any possible implementation of the first aspect.

According to an eighth aspect, a computer-readable medium is provided and configured to store a computer program, where the computer program includes an instruction used to perform the method in the second aspect or any possible implementation of the second aspect.

BRIEF DESCRIPTION OF DRAWINGS

FIG. 3 is a schematic structural diagram of an EDMG extended schedule element according to an embodiment;

DESCRIPTION OF EMBODIMENTS

The following describes embodiments of this application with reference to accompanying drawings.

The embodiments of this application may be applied to a wireless local area network (WLAN). IEEE 802.11 series standards are currently used for the WLAN. The WLAN may include a plurality of basic service sets (BSS). A network node in a BSS is a STA. The STA includes an access point station, namely, an AP, and a none access point station (non-AP STA). Each BSS may include one AP and a plurality of non-AP STAs associated with the AP.

The AP is also referred to as a wireless access point, a hotspot, or the like. The AP is an access point allowing a mobile user to access a wired network, and is mainly deployed in a household, a building, and a campus. A typical coverage radius is tens of meters to hundreds of meters. Certainly, the AP may also be deployed outdoors. The AP is equivalent to a bridge connecting the wired network to a wireless network. A main function of the AP is to connect wireless network clients and then connect the wireless network to the Ethernet. Specifically, the AP may be a terminal device or a network device that is equipped with a Wireless Fidelity (Wi-Fi) chip. Optionally, the AP may be a device supporting the 802.11ax standard. Further, optionally, the AP may be a device supporting a plurality of WLAN standards, such as 802.11ac, 802.11n, 802.11g, 802.11b, and 802.11a.

The non-AP STA may be a wireless communications chip, a wireless sensor, or a wireless communications terminal, for example, a mobile phone supporting a Wi-Fi communication function, a tablet computer supporting a Wi-Fi communication function, a set-top box supporting a Wi-Fi communication function, an intelligent television supporting a Wi-Fi communication function, an intelligent wearable device supporting a Wi-Fi communication function, an in-vehicle communications device supporting a Wi-Fi communication function, or a computer supporting a Wi-Fi communication function. Optionally, the station may support the 802.11ax standard. Further, optionally, the station supports a plurality of WLAN standards, such as 802.11ac, 802.11n, 802.11g, 802.11b, and 802.11a.

In 802.11ad, scheduling for data transmission/beamforming training is mainly performing indication in a directional multi-gigabit (DMG) extended schedule element (extended schedule element) in a beacon (Beacon) frame and an announcement frame (announcement frame). However, the DMG extended schedule element supports scheduling for an AP and a STA only on one 2.16 GHz channel, and does not support scheduling for MIMO or MIMO BF. Therefore, the embodiments of this application provide a scheduling method in a WLAN, so as to indicate MIMO scheduling information or beamforming BF scheduling information.

Figure 1:
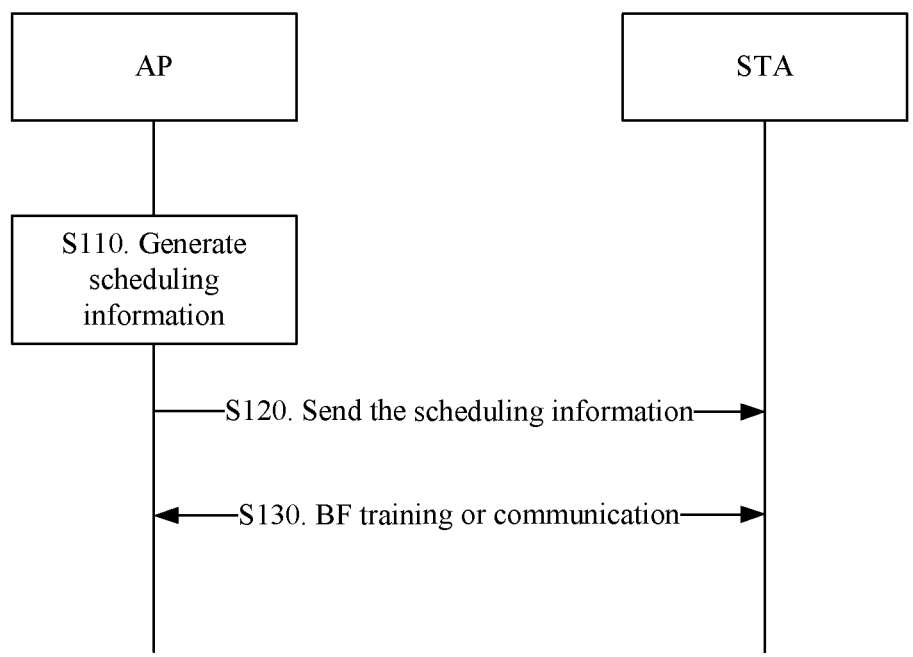
FIG. 1 is a schematic flowchart of a scheduling method in a WLAN according to an embodiment.

FIG. 1 is a schematic flowchart of a scheduling method in a WLAN according to an embodiment.

S110. An AP generates scheduling information.

The scheduling information includes multiple-input multiple-output MIMO scheduling information or beamforming BF scheduling information. When MIMO communication is performed, the AP schedules a STA by using the MIMO scheduling information; or when BFT is performed, the AP schedules a STA by using the BF scheduling information.

Optionally, in this embodiment, the MIMO scheduling information may include first antenna identity ID information and modulation and coding scheme MCS information.

Specifically, the first antenna ID information is used to indicate an antenna, of the STA, that participates in the MIMO communication. A field carrying the first antenna ID information may be referred to as a first antenna identity ID indication field. A value of the first antenna identity ID indication field may indicate an antenna or antennas of the STA that participate in communication. The MCS information is used to indicate an uplink MCS value that the AP suggests the STA to use. A field carrying the MCS information may be referred to as an MCS indication field. A value of the MCS indication field may indicate an MCS value suggested by the AP.

Further, the MIMO scheduling information may further include first spatial stream quantity indication information, indicating a quantity of spatial streams in the MIMO communication. A field carrying the spatial stream quantity indication information may be referred to as a first spatial stream quantity indication field.

Further, the MIMO scheduling information may further include first MIMO type information, used to instruct the STA to perform communication by using a single-user multiple-input multiple-output SU-MIMO BF configuration or a multi-user multiple-input multiple-output MU-MIMO BF configuration. A field carrying the first MIMO type information may be referred to as a first MIMO type indication field. A value of the first MIMO type indication field may indicate whether the STA is to perform communication by using the SU-MIMO BF configuration or the MU-MIMO BF configuration. Specifically, at a BFT phase before the MIMO communication, the AP and the STA may perform SU-MIMO-type beamforming training or perform MU-MIMO-type beamforming training. At a communication phase, the AP may instruct the STA to perform communication by using a configuration previously obtained by performing SU-MIMO-type beamforming training, or a configuration obtained by performing MU-MIMO-type beamforming training.

Further, the MIMO scheduling information may further include first BF type information, used to instruct the STA to perform communication by using a fine BF configuration or a coarse BF configuration. A field carrying the first BF type information may be referred to as a BF type indication field. Correspondingly, a value of the BF type indication field may indicate whether the STA is to communicate with the AP by using the fine BF configuration or the coarse BF configuration. Specifically, at the BFT phase before the MIMO communication, the AP and the STA may perform fine BF or coarse BF. A result obtained after a BRP procedure is referred to as the fine BF configuration, and a result obtained after the coarse BF is referred to as the coarse BF configuration. At the communication phase, the AP may instruct, by using the first BF type information, the STA to perform communication by using the coarse BF configuration or the fine BF configuration.

Optionally, in this embodiment, the BF scheduling information includes second spatial stream quantity information, second MIMO type information, second BF type information, and second antenna identity ID information.

Specifically, at the BFT phase, the STA needs to know a quantity of spatial streams in the BFT, and after the BFT ends, select transmit antennas whose quantity is the same as the quantity of spatial streams. In this embodiment of this application, the AP may inform the STA of the quantity of spatial streams in the BFT by using the second spatial stream quantity information carried in a second spatial stream quantity indication field. After the BFT ends, the STA may select transmit antennas whose quantity is the same as a quantity of spatial streams that is indicated by the second spatial stream quantity information.

The second MIMO type information is carried in a second MIMO type indication field, and the second MIMO type information is used to instruct the STA to perform SU-MIMO-type beamforming training or perform MU-MIMO-type beamforming training.

The second BF type information is carried in a second BF type indication field, and the second BF type information is used to instruct the STA to perform coarse beamforming training or fine beamforming training. The second antenna ID information may be carried in a second antenna ID indication field, and the second antenna ID information is used to indicate a quantity of sector sweep SSW frames that need to be sent by the AP. Specifically, in 11ay, all transmit antennas of an AP may participate in BFT. Therefore, in addition to a sector countdown (sector countdown) in 11ad, additional information is further required to indicate an antenna countdown (antenna countdown). In this embodiment of this application, the AP may indicate, to the STA by using the second antenna identity ID information, a remaining quantity of antennas of the AP that need to be used to send SSW frames.

S120. The AP sends the scheduling information to a station STA.

S130. The STA performs beamforming training or communication based on the scheduling information.

Specifically, before the MIMO communication is performed, the AP first indicates BFT-related information, such as a quantity of spatial streams, to the STA by using the BF scheduling information. The STA may cooperate, based on the BF scheduling information, with the AP to perform a BFT process. After the BFT ends, the AP and the STA may perform MIMO communication based on a BFT result. In this case, the AP may indicate, to the STA by using the MIMO scheduling information, information related to the MIMO communication, such as a quantity of antennas used in the communication. The STA may determine, based on the MIMO scheduling information, related information for performing MIMO communication with the AP.

According to the scheduling method in a WLAN in this embodiment, the AP can implement, by using the scheduling information, scheduling for the MIMO communication of the STA and BF in a MIMO scenario, and an operation is simple and convenient.

Optionally, the AP may send the scheduling information to the STA by using a beacon frame or an announcement frame (announcement frame). The beacon frame or the announcement frame includes the scheduling information.

In this embodiment, the AP sends the scheduling information by using the beacon frame or the announcement frame, thereby improving flexibility of system scheduling/resource indication.

Further, at least a part of the scheduling information may be carried in a field newly added to the beacon frame or the announcement frame, namely, a scheduling information indication field. In other words, according to the method in this embodiment, the newly added scheduling information indication field in the beacon frame or the announcement frame may be used to carry a part or all of the scheduling information.

Specifically, in 802.11ad, scheduling for data transmission/beamforming training is mainly performing indication in a directional multi-gigabit DMG extended schedule element in a beacon frame and an announcement frame. However, the DMG extended schedule element supports scheduling for an AP and a STA only on one 2.16 GHz channel, and does not support scheduling for MIMO or MIMO BF. The 11ay Special Interest Group (11ay SIG) has agreed to add a channel allocation indication field (channel allocation field) to a new enhanced DMG extended schedule element (enhanced DMG extended schedule element). Therefore, a scheduling information indication field may be added to the EDMG extended schedule element, to add an indication related to MIMO and MIMO BF.

Figure 2:
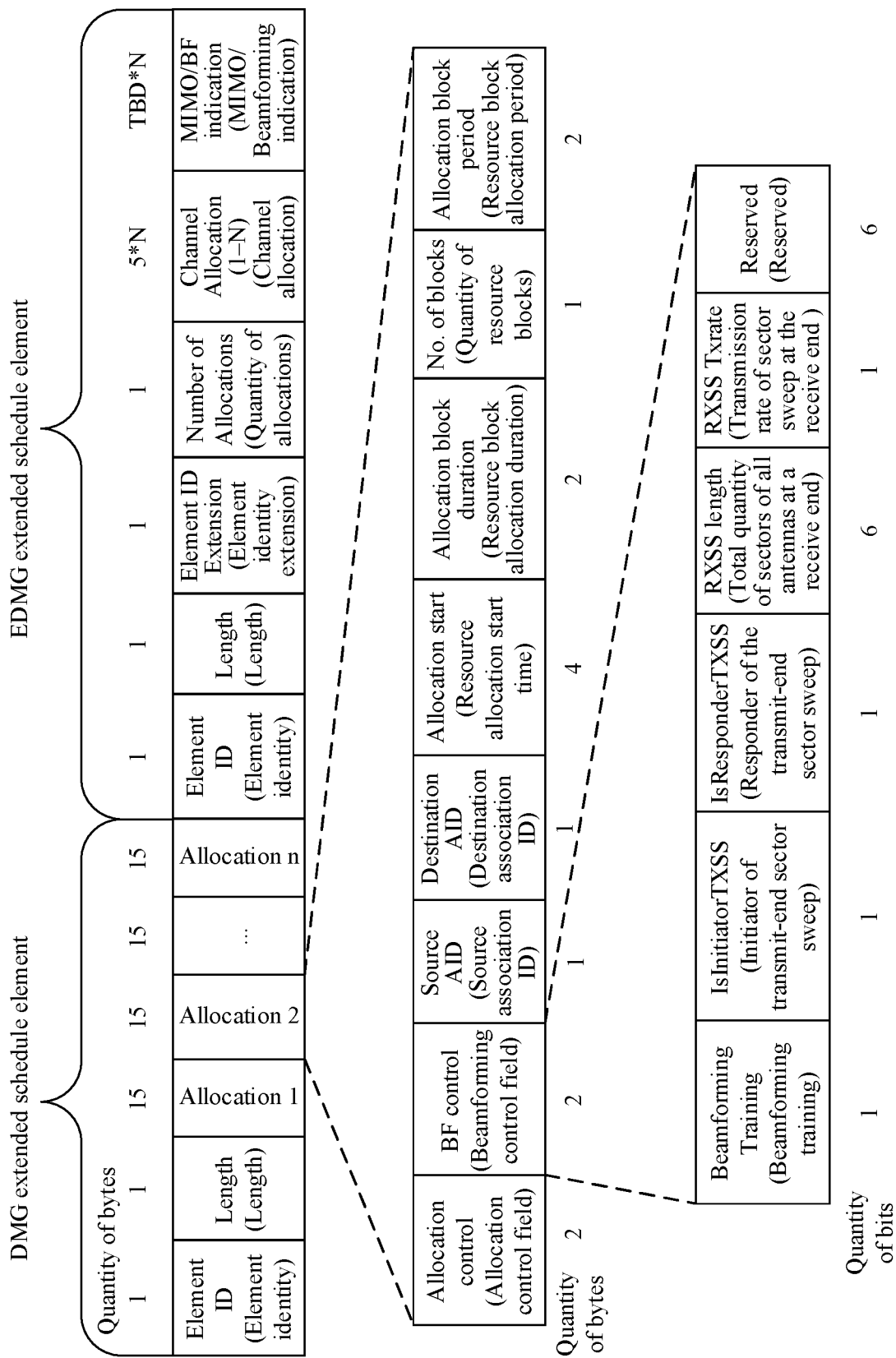
FIG. 2 is a schematic diagram of a partial frame format of a beacon frame or an announcement frame to which a scheduling information indication field is added.

A partial frame format of a beacon frame or an announcement frame to which a scheduling information indication field is added is shown in FIG. 2. A frame structure shown in FIG. 2 merely shows structures of a DMG extended schedule element and an EDMG extended schedule element. For a complete frame format, refer to the prior art. For brevity, fields related to frame fields that are other than the DMG extended schedule element and the EDMG extended schedule element are not described herein. As shown in FIG. 2, the EDMG extended schedule element is located after the DMG extended schedule element. The following briefly describes fields included in the DMG extended schedule element and the EDMG extended schedule element. It should be understood that a MIMO/beamforming indication field in FIG. 2 is the scheduling information indication field in this embodiment of this application. The MIMO/beamforming indication field shown in FIG. 2 occupies TBD bytes shown in FIG. 2.

First, same fields included in the DMG extended schedule element and the EDMG extended schedule element are described.

Element ID: an element identity. An Element ID in the DMG extended schedule element is used to indicate an identity (identity, ID) number of the DMG extended schedule element. An Element ID in the EDMG extended schedule element is used to indicate an ID number of the EDMG extended schedule element.

Length: A Length in the DMG extended schedule element is used to identify a length of the DMG extended schedule element. A Length in the EDMG extended schedule element is used to identify a length of the EDMG extended schedule element.

The following describes fields in the DMG extended schedule element.

Allocation: an allocation field: allocation 1, allocation 2, . . . , and allocation n shown in the figure. Each allocation field is used to indicate allocation control information for a corresponding STA.

Allocation control: an allocation control field.

BF control: a beamforming control field.

Source AID: indicating an association ID of a source station.

Destination AID: indicating an association ID of a target station.

Allocation start: a resource allocation start time.

Allocation block duration: resource block allocation duration.

No. of blocks: used to indicate a quantity of allocated resource blocks.

Allocation block period: a resource block allocation period.

Beamforming training: a beamforming training indication.

Isinitator TXSS: an indication indicating that an AP performs transmit-end sector sweep.

IsResponder TXSS: an indication indicating that a STA performs transmit-end sector sweep.

RXSS length: a total quantity of sectors of all antennas at a receive end.

RXSS TXrate: whether all sector sweep frames are sent by using an MCSO.

Reserved: a reserved byte.

The following describes fields in the EDMG extended schedule element.

Element ID extension: used to indicate an ID number of the EDMG extended schedule element.

Number of allocations: a quantity of allocation fields (a quantity of scheduled STA pairs).

Channel allocation: a channel scheduling and allocation field. Each Channel allocation field includes five bytes. If one channel allocation field is required to perform indication when each STA communicates with an AP, when a quantity of STA pairs scheduled by the AP is N, channel allocation fields correspondingly occupy a total of 5 xN bytes.

MIMO/BF indication: a MIMO/beamforming indication field, namely, the scheduling information indication field in this embodiment of this application.

For the foregoing fields other than the MIMO/beamforming indication field, refer to the prior art. For brevity, details are not described herein.

The beamforming control field shown in FIG. 2 includes a beamforming training field. A value of the beamforming training field is used to indicate whether information carried in the scheduling information indication field is the MIMO scheduling information or the BF scheduling information. For example, when the value of the beamforming training field is 1, the information carried in the scheduling information indication field is the BF scheduling information; or when the value of the beamforming training field is 0, the information carried in the scheduling information indication field is the MIMO scheduling information.

In an embodiment, the scheduling information indication field may carry at least a part of the MIMO scheduling information. The scheduling information indication field in the structure shown in FIG. 2 may include the first antenna identity ID indication field and the MCS indication field.

Optionally, the scheduling information indication field may further include the first spatial stream quantity indication field.

Further, the scheduling information indication field may include the first MIMO type indication field. Assuming that the STA and the AP have successfully performed MU-MIMO and SU-MIMO BF training, the first MIMO type indication field may indicate which BF configuration is used by the STA to perform communication, that is, whether the STA performs communication by using an MU-MIMO BF training result or an SU-MIMO BF training result.

Further, the scheduling information indication field may further include the first BF type indication field. Assuming that the STA and the AP have completed fine BF training, the AP may instruct the STA to perform communication by using a fine BF configuration, or the AP may instruct the STA to perform communication by using a previous coarse BF configuration.

In another embodiment, the scheduling information indication field is used to carry at least a part of the BF scheduling information. The scheduling information indication field in the structure shown in FIG. 2 may include the second MIMO type indication field, the second BF type indication field, the second spatial stream quantity indication field, and the second antenna identity ID information.

Optionally, a reserved bit in the beamforming control field in the DMG extended schedule element in the structure shown in FIG. 2 may be used as the second antenna ID indication field. In other words, a value of the reserved bit in the beamforming control field may indicate the second antenna ID information. For example, one reserved bit in the beamforming control field is the second antenna ID indication field, and a value of the reserved bit indicates the second antenna ID information.

With reference to the MIMO scheduling information and the BF scheduling information, the first MIMO type indication field and the second MIMO type indication field may be a same field in the scheduling information indication field. The first spatial stream quantity indication field and the second spatial stream quantity indication field may be a same field in the scheduling information indication field. The first antenna identity ID indication field and the second antenna identity ID indication field may be a same field in the scheduling information indication field. The first BF type indication field and the second BF type indication field may be a same field in the scheduling information indication field. In other words, according to the method in this embodiment of this application, scheduling at a MIMO communication phase and scheduling at a BFT training phase may be performed for the STA by sending, to the AP, frames of a same structure, such as the beacon frame or the announcement frame; and the scheduling at the MIMO communication phase and the scheduling at the BFT training phase do not need to be separately performed for the STA by using frames of different frame structures.

FIG. 3 is a structural diagram of an EDMG extended schedule element according to an embodiment.

As shown in FIG. 3, a MIMO/beamforming indication field in the EDMG extended schedule element includes a MIMO type field, a BFT type field, a Number of SS field, an Antenna bit Map field, and an MCS field. The following describes in detail the five fields included in the MIMO/beamforming indication field shown in FIG. 3.

It should be understood that the MIMO/beamforming indication field shown in FIG. 3 may be the scheduling information indication field in this embodiment of this application.

It should be noted that each MIMO/beamforming indication field occupies TBD2 bytes, an AP schedules N pairs of STAs, and MIMO/beamforming indication fields corresponding to the N pairs of STAs occupy a total of TBD2×N bytes. Herein, TBD2 changes as a value of TBD1 changes. For example, if TBD1=64, TBD2=1+1+2+(64/8)+4=16, that is, each MIMO/beamforming indication field occupies 16 bytes. It should be understood that the quantity TBD of bytes occupied by the MIMO/beamforming indication field shown in FIG. 2 may be equal to TBD2.

(1) BFT type field: a beamforming type field. This field may be the aforementioned first BF indication field or second BF type indication field.

At a beamforming training phase, assuming that a STA and the AP have completed coarse BF training, if the AP instructs the STA to perform coarse (coarse) BF training again, the STA starts coarse BF training again. For example, if the AP has not scheduled the STA for a long time, or has not received feedback of the STA to data sent by the AP to the STA and considers that an original BF configuration fails, the AP may instruct the STA to perform coarse BF training again. In addition, if the AP instructs the STA to continue to perform fine BF training, the STA continues with a BRP procedure based on an original coarse BF configuration. For example, when a value of the BFT type field is 0, it indicates that the AP instructs the STA to perform coarse BF training again; or when a value of the BFT type field is 1, it indicates that the AP instructs the STA to continue to perform fine BF training. This is not limited in this embodiment of this application.

At a data transmission phase, namely, the MIMO communication phase or the communication phase described above, assuming that the STA and the AP have completed fine BF training, the AP may instruct the STA to perform communication by using a fine BF configuration. Certainly, the AP may alternatively instruct the STA to perform communication by using the previous coarse BF configuration. For example, a channel on which the STA and the AP perform BF is different from a channel for scheduling-based transmission. When an original BF configuration is no longer valid, the AP instructs the STA to perform communication by using the previous coarse BF configuration.

(2) MIMO type field: a MIMO type field. This field may be the aforementioned first MIMO type indication field or second MIMO type indication field.

At the beamforming training phase, for example, if a value of a beamforming training field shown in FIG. 2 is 1, and the MIMO type field is 1, it indicates that the AP and a plurality of STAs that have completed BF training are to perform DL MU-MIMO training. Then the STAs receive SSW frames by using a previous BF configuration, at a time specified by the allocation field in the DMG extended schedule element, and on a channel specified by a channel allocation field (refer to FIG. 4) in the EDMG extended schedule element; and send feedback during polling of the AP. The AP determines whether a current MU-MIMO process succeeds. Alternatively, if a value of a beamforming training field in a BF control field shown in FIG. 2 is 1, and the MIMO type field is 0, it indicates that the AP and a single STA are to perform SU-MIMO BF training. Then the STA receives an SSW frame by using a previous BF configuration, at a time specified by the Allocation field in the DMG extended schedule element, and on a channel specified by a channel allocation field (refer to FIG. 4) in the EDMG extended schedule element.

At the data transmission phase, assuming that a STA and the AP have successfully performed MU-MIMO and SU-MIMO BF training, the MIMO type field may indicate which BF configuration is to be used by the STA to perform communication.

(3) Number of SS field: a communication spatial stream quantity field. This field may be the aforementioned first spatial stream quantity indication field or second spatial stream quantity indication field.

At the beamforming training phase, when the AP sends SSW frames by using all sectors of all or some antennas, the Number of SS field indicates a quantity of antennas of a STA that need to be used to feed back SSW feedback (feedback) frames. For example, feedback information of two antennas is required in 2×2 MIMO, and feedback information of four antennas is required in 4×4 MIMO.

At the data transmission phase, for example, the STA and the AP have completed 4×4 MIMO BF (Number of SS=4) training, and the AP may instruct the AP to communicate with the STA only by using two of the antennas (Number of SS=2), and communicate with another STA at a same moment at another frequency band by using the other two antennas. It should be noted that, in this embodiment, the Number of SS field indicates that the STA is to perform communication by using two of the antennas, and which two antennas are specifically used to perform communication needs to be indicated by the AP by using the following Antenna Bitmap field.

(4) Antenna Bitmap field: an antenna bitmap field. This field may be the aforementioned first antenna identity ID indication field or second antenna identity ID indication field.

In a 802.11ad/ay BF process, because only one antenna participates in BF or communication in 11ad, a countdown value in the prior art can indicate a quantity of SSW frames that still need to be sent by an AP on the antenna. In 11ay, all transmit antennas of an AP participate in BF. Therefore, in addition to a sector countdown in 11ad, additional information is further required to indicate a remaining quantity of antennas of the AP that need to be used to send SSW frames. The Antenna Bitmap field may include TBD1 bits, and the TBD1 bits are corresponding to a total of TBD1 antennas of a STA. A total quantity of all bits whose values are 1 in the TBD1 bits is equal to a remaining quantity of antennas of the AP that need to be used to send SSW frames; or a total quantity of all bits whose values are 0 in the TBD1 bits is equal to a remaining quantity of antennas of the AP that need to be used to send SSW frames. When the remaining quantity of antennas of the AP is 0, and the sector countdown is 0, in 11ay, the STA determines that the beamforming process ends.

At the data transmission phase, a bit of a corresponding antenna may be set to 1 or 0 to indicate whether the antenna participates in communication.

(5) MCS field: a modulation and coding scheme field. This field may be the aforementioned MCS indication field.

In this embodiment, the AP can implement, by using a beacon frame or an announcement frame in the EDMG extended schedule element shown in FIG. 3, beamforming training scheduling or data transmission scheduling for the STA in a MIMO scenario.

The following describes an indication information field for the scheduling information indication field in the DMG extended schedule element.

Optionally, in this embodiment, because performance of an 11ad STA is different from that of an 11ay STA, an AP may further indicate, to a STA by using an indication information field in a beacon frame or an announcement frame, whether the beacon frame or the announcement frame has the scheduling information indication field. For example, when a value of the indication information field is 1, it indicates that the beacon frame or the announcement frame includes the scheduling information indication field; or when a value of the indication information field is 0, it indicates that the beacon frame or the announcement frame does not include the scheduling information indication field. The STA may determine, by reading the indication information field, whether the beacon frame or the announcement frame includes the scheduling information indication field. If the STA determines that the beacon frame or the announcement frame includes the scheduling information indication field, the STA continues to read the scheduling information indication field; otherwise, the STA considers that reading of the beacon frame or the announcement frame has been completed.

Optionally, the indication information field may occupy a reserved bit in a channel allocation field in an EDMG extended schedule element in the beacon frame or the announcement frame.

Figure 4:
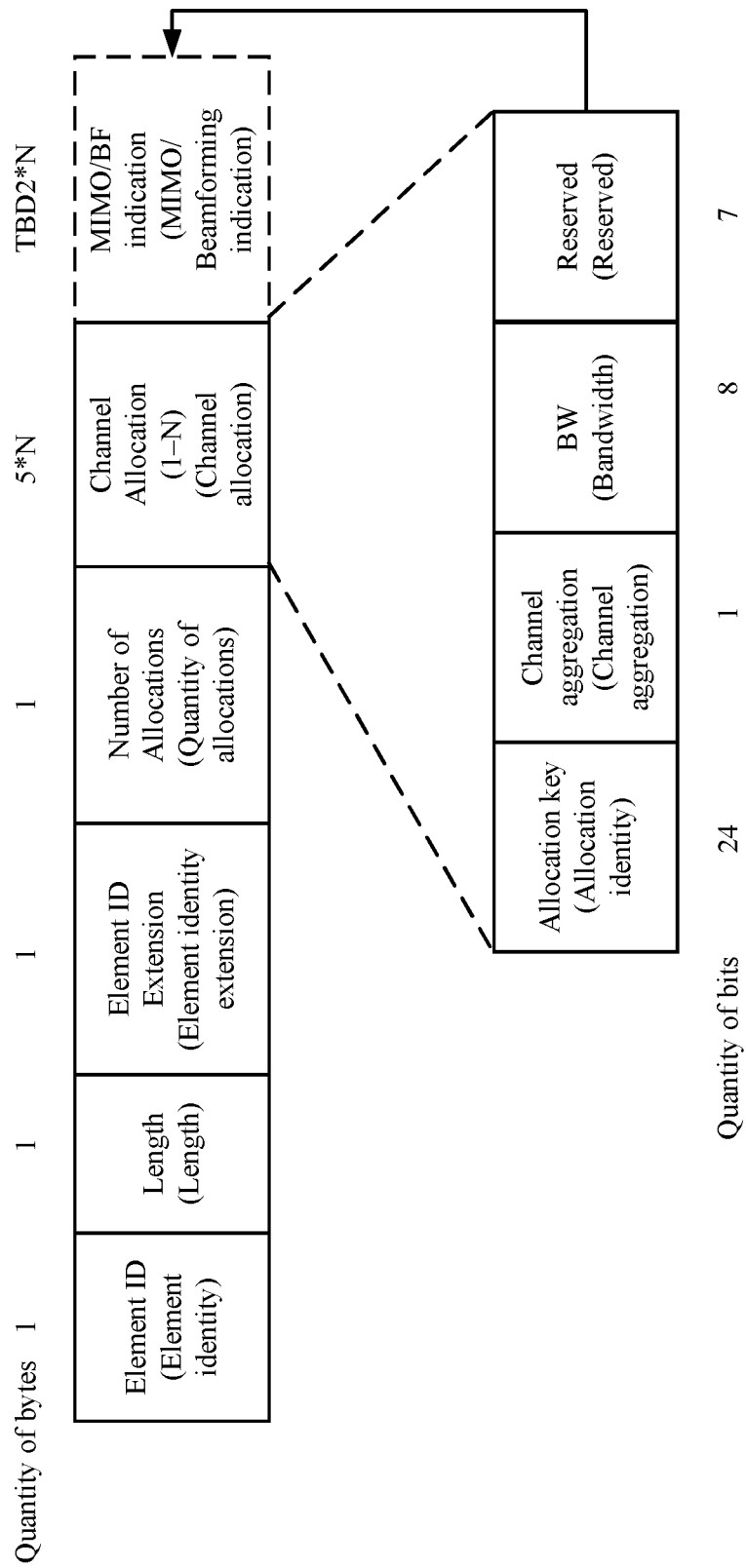
FIG. 4 is a schematic diagram of a specific structure of an EDMG extended schedule element.

Specifically, FIG. 4 shows a specific structure of the EDMG extended schedule element. It should be understood that a MIMO/beamforming indication field shown in FIG. 4 is the scheduling information indication field in this embodiment of this application. In the structure shown in FIG. 4, a channel allocation field includes an allocation key field, a channel aggregation field, a BW field, and a reserved field. The allocation key field is an allocation identity, and indicates an ID of a STA pair participating in communication. The channel aggregation field indicates a channel aggregation flag. The BW field indicates operating bandwidth. The reserved field is a reserved field. Specifically, for details about the four fields shown in FIG. 4, refer to the prior art. For brevity, details are not described herein. In this embodiment of this application, one bit in the reserved field shown in FIG. 4 may be used to indicate whether the EDMG extended schedule element includes the scheduling information indication field.

Figure 5:
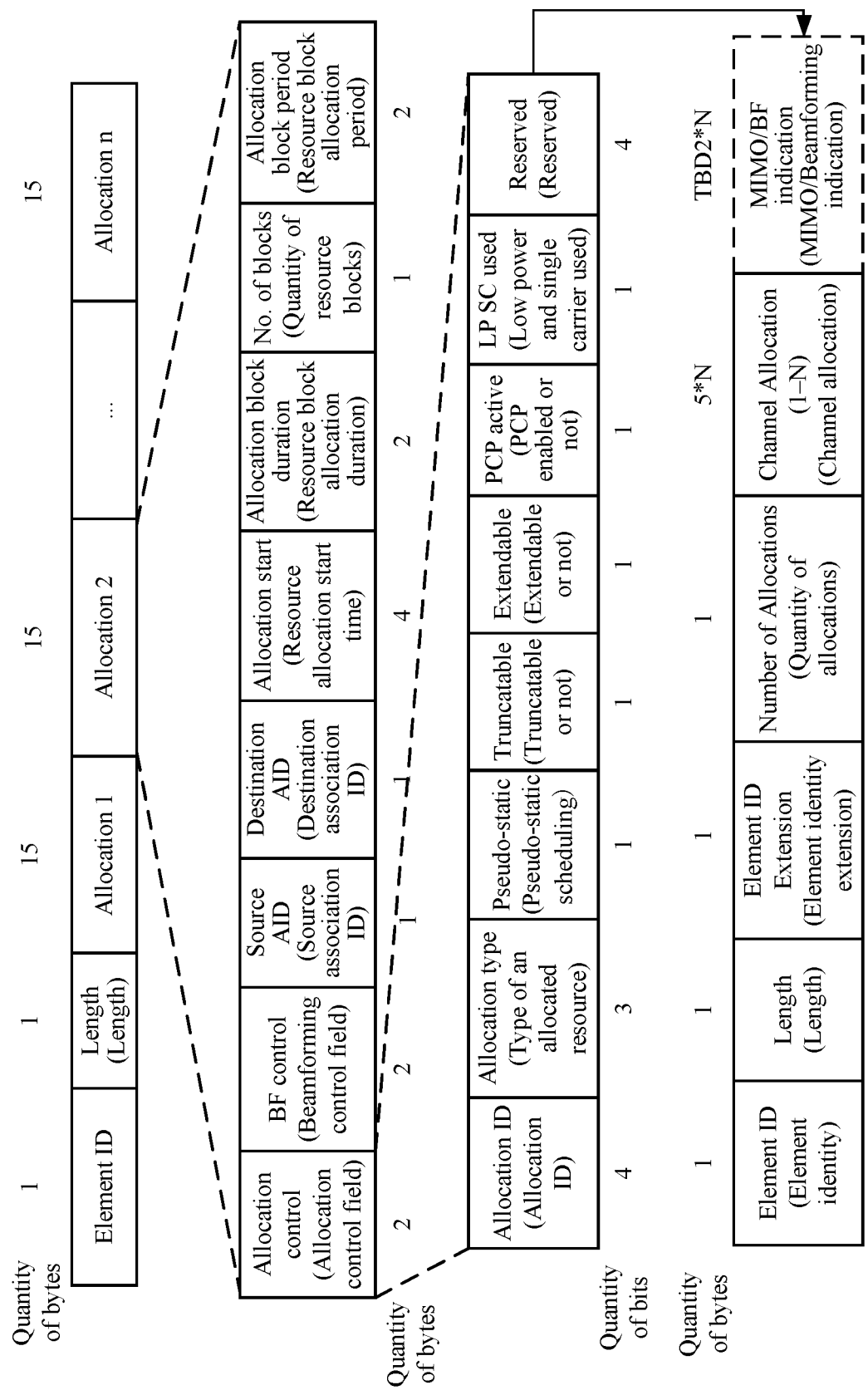
FIG. 5 is a schematic diagram of a specific structure of a DMG extended schedule element.

Specifically, FIG. 5 shows a specific structure of the DMG extended schedule element. It should be understood that a MIMO/beamforming indication field shown in FIG. 5 may be the scheduling information indication field in this embodiment of this application. An allocation control field in the DMG extended schedule element shown in FIG. 5 includes the following fields. The following merely describes the fields briefly.

Allocation ID: an ID of an allocated communications station pair.

Allocation type: a type of an allocated resource. Pseudo-static: whether a scheduling mode is pseudo-static scheduling.

Truncatable: whether an allocated channel resource is truncatable.

Extendable: whether an allocated channel resource is extendable.

PCP active: whether a personal control point (Personal Control Point, PCP) is enabled.

LP SC used: a low-power single-carrier PHY is used.

Reserved: a reserved byte.

In this embodiment, one bit in the reserved field in the allocation control field shown in FIG. 5 may be used to indicate whether the EDMG extended schedule element includes the scheduling information indication field.

The foregoing describes in detail the scheduling method in a WLAN according to the embodiments with reference to FIG. 1 to FIG. 5. The following describes a scheduling device in a WLAN according to the embodiments with reference to FIG. 6 to FIG. 9.

Figure 6:
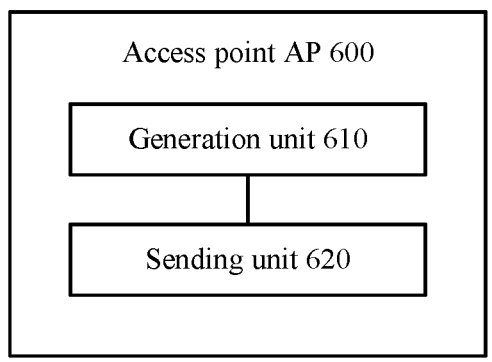
FIG. 6 is a schematic block diagram of an access point AP 600 according to an embodiment.

FIG. 6 is a schematic block diagram of an access point AP 600 according to an embodiment of this application. As shown in FIG. 6, the access point AP 600 includes a generation unit 610 and a sending unit 620.

The generation unit 610 is configured to generate scheduling information, where the scheduling information includes multiple-input multiple-output MIMO scheduling information or beamforming BF scheduling information, the MIMO scheduling information is used to schedule a station STA to perform MIMO communication, and the BF scheduling information is used to schedule the STA to perform beamforming training.

The sending unit 620 is configured to send the scheduling information to the STA.

The units of the access point AP 600 and the foregoing other operations or functions according to this embodiment are used to implement a corresponding process executed by an access point AP in the foregoing method. For brevity, details are not described herein again.

Therefore, the access point AP in this embodiment can implement, by using the scheduling information, scheduling for the MIMO communication of the STA and BF in a MIMO scenario, and an operation is simple and convenient.

Figure 7:
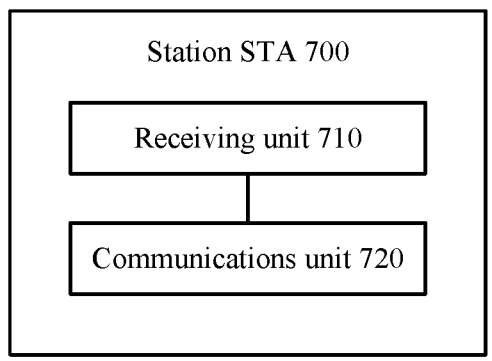
FIG. 7 is a schematic block diagram of a station STA 700 according to an embodiment.

FIG. 7 is a schematic block diagram of a station STA 700 according to an embodiment of this application. As shown in FIG. 7, the station STA 700 includes a receiving unit 710 and a communications unit 720.

The receiving unit 710 is configured to receive scheduling information sent by an access point AP, where the scheduling information includes multiple-input multiple-output MIMO scheduling information or beamforming BF scheduling information, the MIMO scheduling information is used to schedule the station STA to perform MIMO communication, and the BF scheduling information is used to schedule the STA to perform beamforming training.

The communications unit 720 is configured to perform beamforming training or MIMO communication based on the scheduling information.

The units of the station STA 700 and the foregoing other operations or functions according to this embodiment of this application are used to implement a corresponding process executed by a station STA in the foregoing method. For brevity, details are not described herein again.

Therefore, the STA in this embodiment of this application can implement the MIMO communication and BF in a MIMO scenario by reading the scheduling information, and an operation is simple and convenient.

Figure 8:
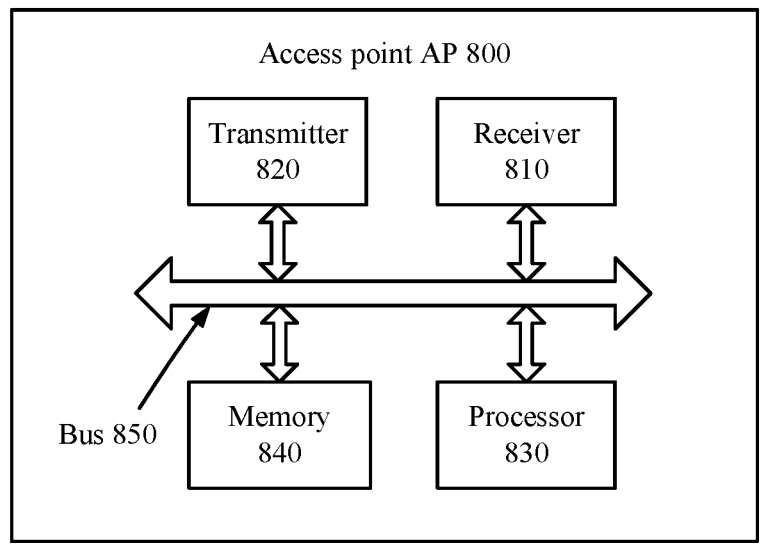
FIG. 8 is a schematic structural diagram of an access point AP 800 according to an embodiment.

FIG. 8 is a schematic structural diagram of an access point AP 800 according to an embodiment of this application. As shown in FIG. 8, the access point AP 800 includes a receiver 810, a transmitter 820, a processor 830, a memory 840, and a bus system 850. The receiver 810, the transmitter 820, the processor 830, and the memory 840 are connected by using the bus system 850. The memory 840 is configured to store an instruction. The processor 830 is configured to execute the instruction stored in the memory 840, so as to control the receiver 810 to receive a signal, and control the transmitter 820 to send a signal.

The processor 830 is configured to generate scheduling information, where the scheduling information includes multiple-input multiple-output MIMO scheduling information or beamforming BF scheduling information, the MIMO scheduling information is used to schedule a station STA to perform MIMO communication, and the BF scheduling information is used to schedule the STA to perform beamforming training.

The transmitter 820 is configured to send the scheduling information to the STA.

It should be understood that, in this embodiment of this application, the processor 830 may be a central processing unit (central processing unit, CPU), or the processor 830 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 840 may include a read-only memory and a random access memory, and provide an instruction and data for the processor 830. A part of the memory 840 may further include a non-volatile random access memory. For example, the memory 840 may further store information of a device type.

The bus system 850 may further include a power bus, a control bus, a status signal bus, and the like, in addition to a data bus. However, for clarity of description, various types of buses in the figure are marked as the bus system 850.

In an implementation process, steps in the foregoing method may be implemented by using a hardware integrated logic circuit in the processor 830, or by using an instruction in a form of software. The method steps of the scheduling method in a WLAN in the embodiments of this application may be directly performed by a hardware processor, or performed by a combination of hardware and a software module in a processor. The software module may be located in a mature storage medium in the art, such as a random access memory, a flash memory, a read-only memory, a programmable read-only memory, an electrically erasable programmable memory, or a register. The storage medium is located in the memory 840, and the processor 830 reads information in the memory 840 and performs the steps in the foregoing method in combination with hardware of the processor. To avoid repetition, details are not described herein again.

The units of the access point AP 800 and the foregoing other operations or functions according to this embodiment are used to implement a corresponding process executed by an AP in the foregoing method. For brevity, details are not described herein again.

Therefore, the access point AP in this embodiment can implement, by using the scheduling information, scheduling for the MIMO communication of the STA and BF in a MIMO scenario, and an operation is simple and convenient.

Figure 9:
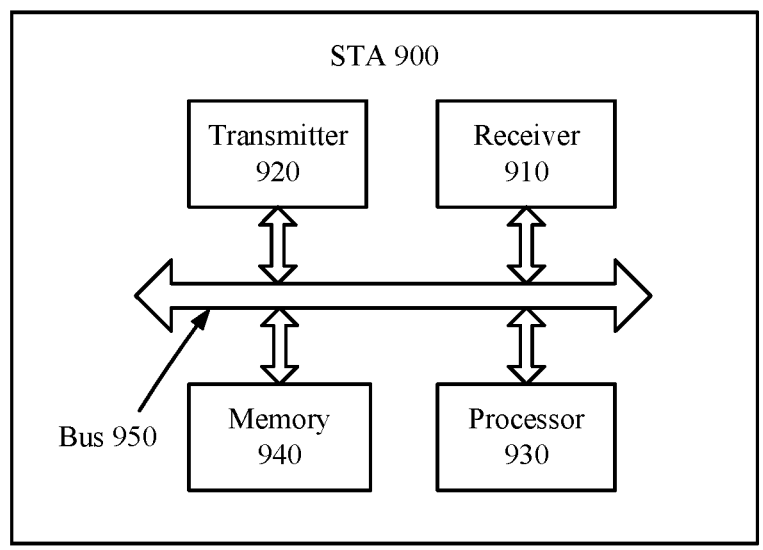
FIG. 9 is a schematic structural diagram of a station STA 900 according to an embodiment.

FIG. 9 is a schematic structural diagram of a station STA 900 according to an embodiment of this application. As shown in FIG. 9, the station STA 900 includes a receiver 910, a transmitter 920, a processor 930, a memory 940, and a bus system 950. The receiver 910, the transmitter 920, the processor 930, and the memory 940 are connected by using the bus system 950. The memory 940 is configured to store an instruction. The processor 930 is configured to execute the instruction stored in the memory 940, so as to control the receiver 910 to receive a signal, and control the transmitter 920 to send a signal.

The receiver 910 is configured to receive scheduling information sent by an access point AP, where the scheduling information includes multiple-input multiple-output MIMO scheduling information or beamforming BF scheduling information, the MIMO scheduling information is used to schedule the station STA to perform MIMO communication, and the BF scheduling information is used to schedule the STA to perform beamforming training.

The receiver 910 and the transmitter 920 are configured to perform beamforming training or MIMO communication based on the scheduling information.

It should be understood that, in this embodiment of this application, the processor 930 may be a central processing unit (Central Processing Unit, CPU), or the processor 930 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 940 may include a read-only memory and a random access memory, and provide an instruction and data for the processor 930. A part of the memory 940 may further include a non-volatile random access memory. For example, the memory 940 may further store information of a device type.

The bus system 950 may further include a power bus, a control bus, a status signal bus, and the like, in addition to a data bus. However, for clarity of description, various types of buses in the figure are marked as the bus system 950.

In an implementation process, steps in the foregoing method may be implemented by using a hardware integrated logic circuit in the processor 930, or by using an instruction in a form of software. The method steps of the scheduling method in a WLAN in the embodiments of this application may be directly performed by a hardware processor, or performed by a combination of hardware and a software module in a processor. The software module may be located in a mature storage medium in the art, such as a random access memory, a flash memory, a read-only memory, a programmable read-only memory, an electrically erasable programmable memory, or a register. The storage medium is located in the memory 940, and the processor 930 reads information in the memory 940 and performs the steps in the foregoing method in combination with hardware of the processor. To avoid repetition, details are not described herein again.

The units of the station STA 900 and the foregoing other operations or functions according to this embodiment of this application are used to implement a corresponding process executed by a STA in the foregoing method. For brevity, details are not described herein again.

Therefore, the STA in this embodiment of this application can implement the MIMO communication and BF in a MIMO scenario by reading the scheduling information, and an operation is simple and convenient.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

Reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. Different methods to implement the described functions may be used for each particular application and should not be considered that the implementation goes beyond the scope of this application.

For convenience and brevity of description, for a detailed working process of the foregoing system, apparatus, and unit, reference may be made to a corresponding process in the foregoing method embodiments, and details are not described herein again.

In the several embodiments provided, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the method described in the embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A scheduling method in a wireless local area network (WLAN), comprising:
   receiving, by a station (STA), a beacon frame or an announcement frame from an access point (AP), wherein each of the beacon frame and the announcement frame includes a directional multi-gigabit (DMG) extended schedule element and an enhanced DMG extended schedule element, wherein the enhanced DMG extended schedule element includes scheduling information that is not supported by the DMG extended schedule element, wherein the scheduling information comprises multiple-input multiple-output (MIMO) scheduling information or beamforming (BF) scheduling information, wherein the MIMO scheduling information is used to schedule MIMO communication at the STA and the BF scheduling information is used to schedule beamforming training at the STA; and
   performing, by the STA, beamforming training or MIMO communication based on the scheduling information.

2. The method according to claim 1, wherein the MIMO scheduling information comprises first antenna identity (ID) information and modulation and coding scheme (MCS) information, the first antenna ID information is included in a first antenna identity ID indication field, the first antenna ID information is used to indicate an antenna-of the STA that participates in the MIMO communication, the MCS information is included in an MCS indication field, and the MCS information is used to indicate an uplink MCS value that the AP suggests the STA to use.

3. The method according to claim 2, wherein the MIMO scheduling information further comprises at least one of first spatial stream quantity indication information, first MIMO type information or first BF type information, wherein the first spatial stream quantity indication information is included in a first spatial stream quantity indication field, and the first spatial stream quantity indication information is used to indicate a quantity of spatial streams in the MIMO communication, wherein the first MIMO type information is included in a first MIMO type indication field, wherein the first MIMO type information is used to instruct the STA to perform communication by using a single-user multiple-input multiple-output (SU-MIMO BF) configuration or a multi-user multiple-input multiple-output (MU-MIMO BF) configuration, wherein the first BF type information is carried in a first BF type indication field, and wherein the first BF type information is used to instruct the STA to perform communication by using a fine BF configuration or a coarse BF configuration.

4. The method according to claim 1, wherein the BF scheduling information comprises at least one of first spatial stream quantity indication information, first MIMO type information, first BF type information, or first antenna identity ID information, wherein the first spatial stream quantity indication information is included in a first spatial stream quantity indication field, wherein the first spatial stream quantity indication information is used to indicate to the STA a quantity of spatial streams in the beamforming training, wherein the first MIMO type information is in a first MIMO type indication field, wherein the first MIMO type information is used to instruct the STA to perform SU-MIMO-type beamforming training or perform MU-MIMO-type beamforming training, wherein the first BF type information is included in a first BF type indication field, wherein the first BF type information is used to instruct the STA to perform coarse beamforming training or fine beamforming training; the second antenna ID information is included in a first antenna ID indication field, and wherein the first antenna ID information is used to indicate a quantity of sector sweep (SSW) frames that need to be sent by the AP.

5. The method according to claim 4, wherein the first antenna ID indication field is included in a reserved bit in a beamforming control field in a Directional Multi-Gigabit (DMG) extended schedule element.

6. The method according to 1, wherein the beacon frame or the announcement frame further comprises an information indication field for carrying the scheduling information, and wherein the information indication field is used to indicate that the beacon frame or the announcement frame comprises the scheduling information.

7. The method according to claim 6, wherein the information indication field is included in a reserved bit in a channel allocation field in the enhanced directional multi-gigabit (EDMG) extended schedule element in the beacon frame or the announcement frame.

8. An access point (AP) comprising:
   a processor;
   a memory, wherein the memory is configured to store executable program code, and the processor implements the executable program code stored in the memory to
      generate a beacon frame or an announcement frame including scheduling information, wherein each of the beacon frame and the announcement frame includes a directional multi-gigabit (DMG) extended schedule element and an enhanced DMG extended schedule element, wherein the enhanced DMG extended schedule element includes scheduling information that is not supported by the DMG extended schedule element, wherein the scheduling information comprises multiple-input multiple-output (MIMO) scheduling information or beamforming (BF) scheduling information, wherein the MIMO scheduling information is used to schedule a station (STA) to perform MIMO communication, and wherein the BF scheduling information is used to schedule the STA to perform beamforming training; and
   a sending unit configured to send the scheduling information to the STA.

9. The AP according to claim 8, wherein the MIMO scheduling information comprises first antenna identity (ID) information and modulation and coding scheme (MCS) information, wherein the first antenna ID information is included in a first antenna identity ID indication field, the first antenna ID information is used to indicate an antenna-of the STA; that participates in the MIMO communication, wherein the MCS information is included in an MCS indication field, and wherein the MCS information is used to indicate an uplink MCS value that the AP informs the STA to use.

10. The AP according to claim 9, wherein the MIMO scheduling information further comprises at least one of first spatial stream quantity indication information, first MIMO type information, or first BF type information, wherein the first spatial stream quantity indication information is included in a first spatial stream quantity indication field and the first spatial stream quantity indication information is used to indicate a quantity of spatial streams in the MIMO communication, wherein the first MIMO type information is carried in a first MIMO type indication field- and the first MIMO type information is used to instruct the STA to perform communication by using a single-user multiple-input multiple-output SU-MIMO BF configuration or a multi-user multiple-input multiple-output MU-MIMO BF configuration, wherein the first BF type information is included in a first BF type indication field, and wherein the first BF type information is used to instruct the STA to perform communication by using a fine BF configuration or a coarse BF configuration.

11. The AP according to claim 8, wherein the BF scheduling information comprises at least one of first spatial stream quantity indication information, first MIMO type information, first BF type information, or first antenna identity ID information, wherein the first spatial stream quantity indication information is included in a first spatial stream quantity indication field, wherein the first spatial stream quantity indication information is used to indicate to the STA a quantity of spatial streams in the beamforming training, wherein the first MIMO type information is included in a first MIMO type indication field, wherein the first MIMO type information is used to instruct the STA to perform SU-MIMO-type beamforming training or perform MU-MIMO-type beamforming training, wherein the first BF type information is included in a first BF type indication field, wherein the first BF type information is used to instruct the STA to perform coarse beamforming training or fine beamforming training, wherein the first antenna ID information is included in a first antenna ID indication field, and wherein the first antenna ID information is used to indicate a quantity of sector sweep SSW frames to be sent by the AP.

12. The AP according to claim 11, wherein the first antenna ID indication field is included in a reserved bit in a beamforming control field in the DMG extended schedule element.

13. The AP according to claim 11, wherein the beacon frame or the announcement frame further comprises an information indication field, wherein the information indication field is used to indicate that the beacon frame or the announcement frame comprises the scheduling information, wherein the information indication field is included in a reserved bit in an allocation control field in the enhanced directional multi-gigabit (EDMG) extended schedule element in the beacon frame or the announcement frame.

14. A station STA, comprising:
a processor; and
a memory, wherein the memory is configured to store executable program code, and the processor is configured to implement the executable program code stored in the memory to:
receive a beacon frame or an announcement frame from an access point (AP), wherein each of the beacon frame and the announcement frame includes a directional multi-gigabit (DMG) extended schedule element and an enhanced DMG extended schedule element, wherein the enhanced DMG extended schedule element includes scheduling information that is not supported by the DMG extended schedule element, wherein the scheduling information comprises multiple-input multiple-output (MIMO) scheduling information or beamforming (BF) scheduling information, wherein the MIMO scheduling information is used to schedule the STA to perform MIMO communication, and the BF scheduling information is used to schedule the STA to perform beamforming training, and
perform beamforming training or MIMO communication based on the scheduling information.

15. The STA according to claim 14, wherein the MIMO scheduling information comprises first antenna identity (ID) information and modulation and coding scheme (MCS) information, wherein the first antenna ID information is included in a first antenna identity ID indication field, wherein the first antenna ID information is used to indicate an antenna, of the STA that participates in the MIMO communication, wherein the MCS information is included in an MCS indication field, and the MCS information is used to indicate an uplink MCS value that the AP informs the STA to use.

16. The STA according to claim 15, wherein the MIMO scheduling information further comprises at least one of first spatial stream quantity indication information, first MIMO type information, or first BF type information, wherein the first spatial stream quantity indication information is included in a first spatial stream quantity indication field, and the first spatial stream quantity indication information is used to indicate a quantity of spatial streams in the MIMO communication; wherein the first MIMO type information is included in a first MIMO type indication field, wherein the first MIMO type information is used to instruct the STA to perform communication by using a single-user multiple-input multiple-output SU-MIMO BF configuration or a multi-user multiple-input multiple-output MU-MIMO BF configuration, wherein the first BF type information is carried in a first BF type indication field, and wherein the first BF type information is used to instruct the STA to perform communication by using a fine BF configuration or a coarse BF configuration.

17. The STA according to claim 14, wherein the BF scheduling information comprises at least one of second spatial stream quantity indication information, second MIMO type information, second BF type information, or second antenna identity ID information, wherein the second spatial stream quantity indication information is in a second spatial stream quantity indication field, wherein the second spatial stream quantity indication information is used to indicate to the STA a quantity of spatial streams in the beamforming training, wherein the second MIMO type information is included in a second MIMO type indication field, wherein the second MIMO type information is used to instruct the STA to perform SU-MIMO-type beamforming training or perform MU-MIMO-type beamforming training, wherein the second BF type information is included in a second BF type indication field wherein the second BF type information is used to instruct the STA to perform coarse beamforming training or fine beamforming training, wherein the second antenna ID information is included in a second antenna ID indication field, and wherein the second antenna ID information is used to indicate a quantity of sector sweep SSW frames to be sent by the AP.

18. The STA according to claim 17, wherein the second antenna ID indication field is included in a reserved bit in a beamforming control field in the DMG extended schedule element.

19. The STA according to claim 14, wherein the beacon frame or the announcement frame further comprises an information indication field, and wherein the information indication field is used to indicate that the beacon frame or the announcement frame comprises the scheduling information.

20. The STA according to claim 19, wherein the information indication field is included in a reserved bit in an allocation control field in the enhanced directional multi-gigabit (EDMG) extended schedule element in the beacon frame or the announcement frame.

* * * * *